United States Patent [19]
Urich

[11] Patent Number: 4,729,435
[45] Date of Patent: Mar. 8, 1988

[54] SUBSOIL TILLING IMPLEMENT
[75] Inventor: Oren D. Urich, Windsor, Colo.
[73] Assignee: Krause Plow Corporation, Hutchinson, Kans.
[21] Appl. No.: 923,323
[22] Filed: Oct. 27, 1986
[51] Int. Cl.[4] .................... E02F 5/32; A01B 13/08
[52] U.S. Cl. .................... 172/196; 172/446; 172/624.5; 172/672; 172/699; 172/657; 172/776; 403/12; 403/337
[58] Field of Search .............. 172/271, 657, 672, 611, 172/705, 699, 700, 156, 264, 265, 748, 669, 196, 624.5, 159, 155, 714, 715, 776; 52/726; 403/12, 337

[56] References Cited
U.S. PATENT DOCUMENTS

| | | | |
|---|---|---|---|
| 3,465 | 3/1844 | Long | 172/672 |
| 115,701 | 6/1871 | Chambers | 172/672 |
| 942,281 | 12/1909 | Rasmussen | 172/156 |
| 1,688,771 | 10/1928 | Younie | 37/141 T |
| 1,761,858 | 6/1930 | Werk | 172/156 |
| 1,856,435 | 5/1932 | Schwarz | 172/156 X |
| 3,042,118 | 7/1962 | Norris | 172/1 |
| 3,170,421 | 2/1965 | Norris | 111/1 |
| 3,202,222 | 8/1965 | Norris | 172/777 |
| 3,568,613 | 3/1971 | Lange | 172/672 |
| 3,726,346 | 4/1973 | Thompson | 172/446 |
| 4,121,669 | 10/1978 | Sosalla | 172/624.5 |
| 4,269,274 | 5/1981 | Robertson | 172/699 |
| 4,331,205 | 5/1982 | Sorenson | 172/538 |
| 4,415,042 | 11/1983 | Cosson | 172/762 |
| 4,548,277 | 10/1985 | Dietrich | 172/705 |
| 4,560,010 | 12/1985 | Weichel | 172/196 |
| 4,572,301 | 2/1986 | Bourgeois | 172/776 |
| 4,618,006 | 10/1986 | Cosson | 172/699 |

FOREIGN PATENT DOCUMENTS

| | | | |
|---|---|---|---|
| 818632 | 8/1959 | United Kingdom | 172/699 |
| 2012152 | 7/1979 | United Kingdom | 172/657 |

Primary Examiner—Richard J. Johnson
Attorney, Agent, or Firm—Dean P. Edmundson

[57] ABSTRACT

An agricultural tilling implement is described which is adapted to be connected to the rear of a tractor having a three-point hitch. The implement comprises an elongated tool bar which preferably has two attachments thereon, spaced from each other, for connection to the three-point hitch of the tractor. A plurality of tilling units are carried by the tool bar. Each tilling unit comprises a downwardly depending ripper member and two rotatable wheels adjacent the ripper member. The wheels are vertically adjustable and, preferably, are also adjustable inwardly and outwardly as well as forwardly and rearwardly. The wheels are adaptable to hold the soil firmly in the rows so that the ripper member does not disturb or injure the roots of growing row crops. Preferably the tilling units are also adapted to tow a secondary tiller unit.

22 Claims, 5 Drawing Figures

SUBSOIL TILLING IMPLEMENT

FIELD OF THE INVENTION

This invention relates to agricultural tilling equipment. More particularly, this invention relates to equipment and techniques for tilling soil between row crops. In another aspect the invention relates to tilling of soil in preparation for seeding.

BACKGROUND OF THE INVENTION

Various types of tilling implements have previously been described. See, for example, U.S. Pat. Nos. 3,465; 115,701; 942,281; 1,688,771; 1,761,858; 1,856,435; 3,042,118; 3,170,421; 3,202,222; 3,568,613; 4,269,274; 4,331,205; and 4,415,042. None of such patents, however, have described an agricultural tilling implement having multiple and diverse areas of utility as compared to the present invention.

SUMMARY OF THE PRESENT INVENTION

In accordance with the present invention there is provided an agricultural tilling implement which is adapted to be connected to the rear of a tractor having a three-point hitch. The improved implement of this invention comprises, in one embodiment:

(a) an elongated tool bar including first and second attachment means adapted to connect the tool bar to the three-point hitch of a tractor in a manner such that the tool bar is transverse with respect to the tractor; wherein the first and second attachment means are spaced from each other on the tool bar;

(b) a plurality of tilling units carried by the tool bar, each tilling unit comprising:
   (i) a downwardly depending ripper member;
   (ii) two rotatable wheels adjacent the ripper member; the wheels being vertically adjustable; wherein the wheels are adapted to limit the depth of the ripper member in the soil;
wherein each tilling unit is connected to the tool bar by means of a linkage which is adapted to permit the tilling unit to move vertically relative to the tool bar when the ripper member is in the soil being tilled.

In another embodiment there is a secondary tiller unit attached to each tilling unit. The secondary unit may include any desired type of tool such as, for example, cultivating tools, disks, tines, packer baskets, bedding units, ditchers, planters, etc. Preferably the secondary unit is adapted to be attached to the primary tilling unit with a quick-attach connection.

Each tilling unit is separately mounted to the tool bar in a manner such that each unit may move vertically independently of the others and independently of vertical movement of the tool bar when the ripper member is in the soil. This allows each ripper member to maintain the desired depth (e.g., 0 to 14 inches) in the soil even when the tool bar moves vertically, e.g., when the tractor moves over uneven ground or rocks.

The improved tilling implement of this invention is readily adaptable for deep tilling and close cultivating of row crops, for example, with just a single pass through the field required. The implement may also be used for deep tilling, close cultivating, and ditching between row crops in one pass. As another alternative, the implement can be used for deep tilling and bedding (i.e., laying up ridges to plant on) in one pass. Another alternative is to deep till, prepare seed bed, and plant seeds in one pass.

In even another alternative the implement can be used as just a deep tiller without a secondary tiller unit attached. It is also possible to apply fertilizer with the implement of this invention by running a fertilizer delivery tube down the trailing edge of the ripper member to any desired depth.

The tilling implement of the invention can be used, for example, for tilling in fields of row crops where the crops are as small as three inches tall or as large as three feet tall, without damage to the crops or their roots.

Other advantages will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
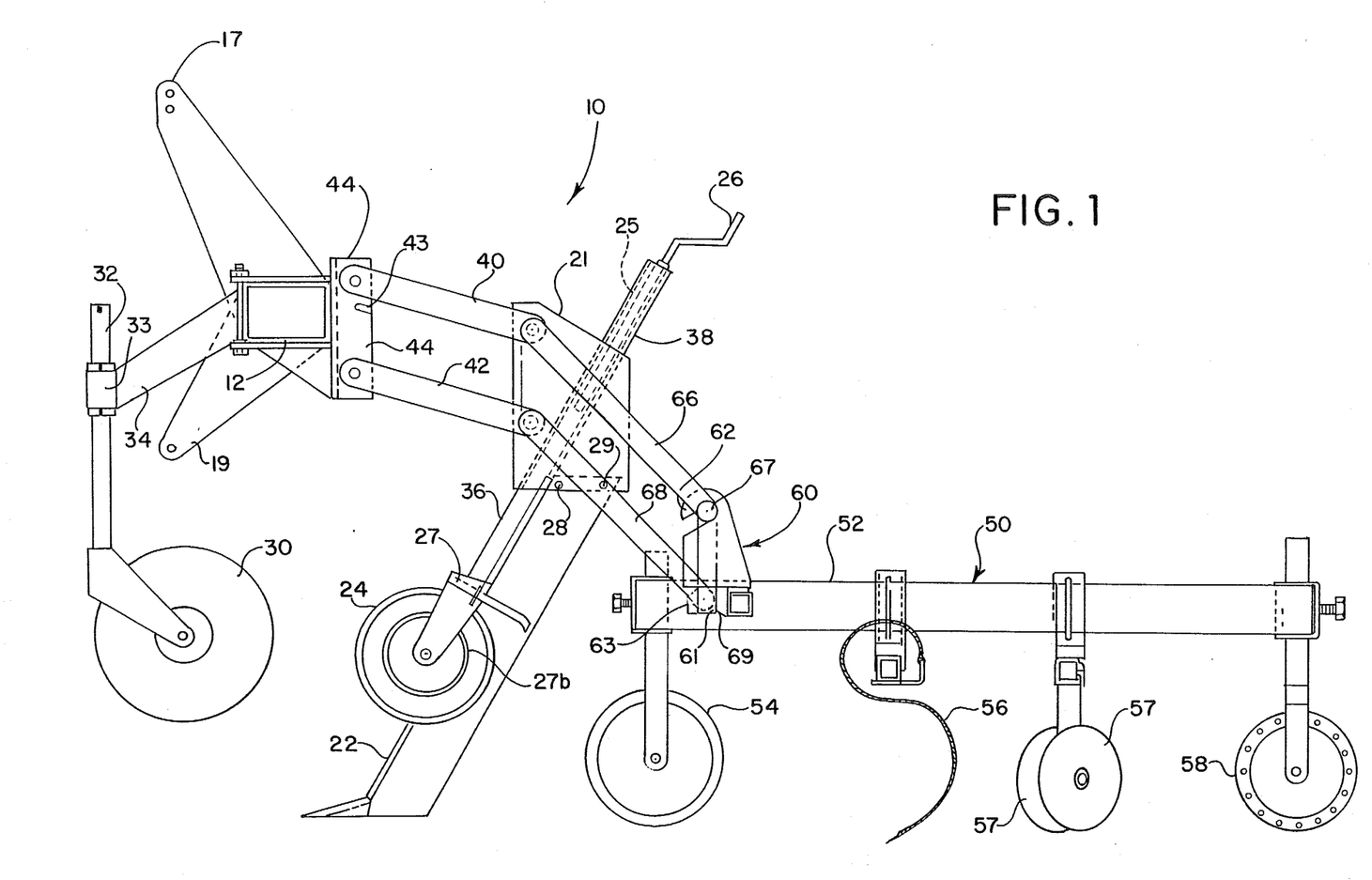
FIG. 1 is a side elevational view of one embodiment of tilling implement of this invention.

In FIG. 1 there is shown a side elevational view of one embodiment of agricultural tilling implement 10 of this invention which is adapted to be connected to the rear of a tractor of the type having a conventional three-point hitch. The tilling implement includes an elongated tool bar 12 preferably having two attachment means thereon for connection to a three-point hitch in a manner such that the tool bar is transverse with respect to the tractor. The tool bar is shown in perspective in FIG. 3.

Figure 3:
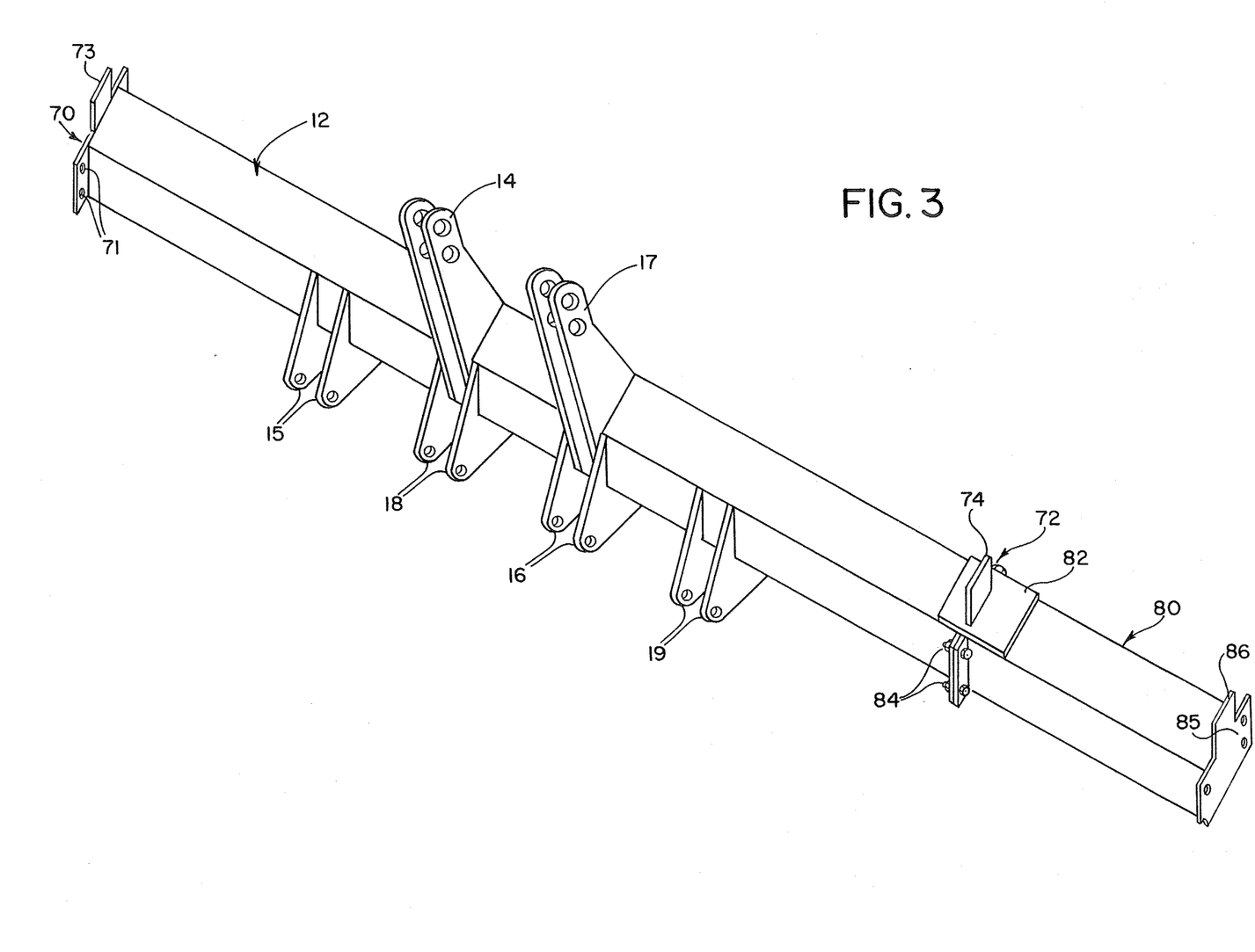
FIG. 3 is a perspective view of a tool bar which is useful in the implement of this invention.

The first attachment means comprises mast members 14, 15, and 16 which are secured to the tool bar. Spaced from the first attachment means on the tool bar is a second attachment means comprising mast members 17, 18 and 19.

The two sets of attachment means are separated from each other on the tool bar so that the implement may be connected to the tractor in two separate manners. When the tool bar is connected to the tractor using one set of attachment means, the tilling units carried by the tool bar are positioned in a manner such that the tilling units run between the rows of row crops (e.g., corn) which are growing in the field. When it is desired to have the tilling units positioned so that they run in the rows (e.g., after a corn field has been harvested), the other set of attachment means is used to connect the tool bar to the tractor.

Thus, it is not necessary to move the tilling units relative to the tool bar when it is desired to switch from one type of tilling (e.g., tilling between row crops) to another type of tilling (e.g., the ripping of a field for bedding or planting). With conventional tillers it has been necessary to loosen the connection to the tool bar of each tilling unit so that each tilling unit can be moved laterally along the tool bar a few inches in order to change its position from between the rows to a position in the rows. This is very time- and labor-consuming and may result in improper spacing of the tilling units due to human error. The improved tilling implement of this invention avoids these problems.

Figure 2:
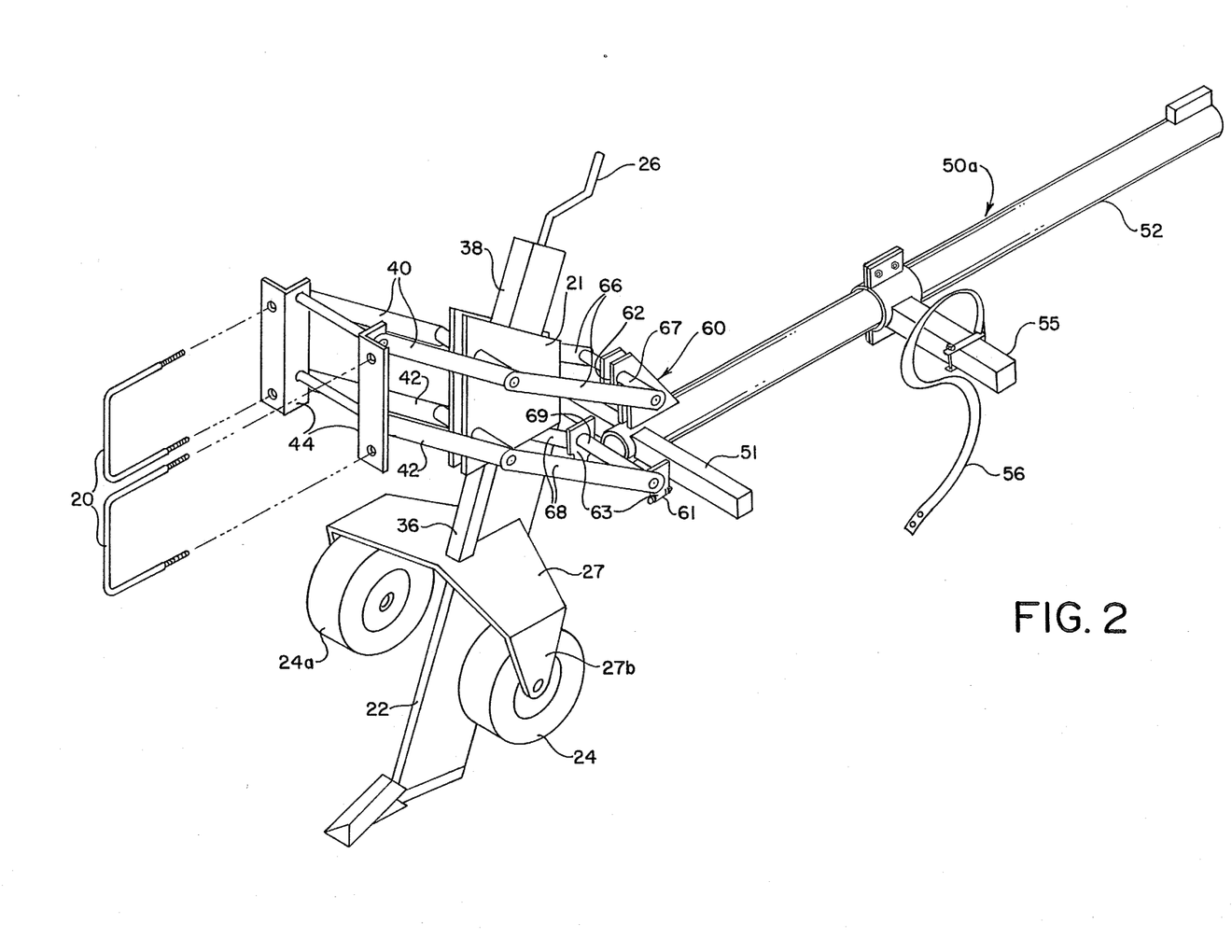
FIG. 2 is a perspective view of one embodiment of tilling unit which is useful in the implement of this invention.

FIG. 2 is a perspective view of one embodiment of an individual tilling unit which is useful in the agricultural tilling implement of the invention. This tilling unit is connectable to the tool bar by means of U-bolts 20.

A plurality of separate tilling units are carried by the tool bar in spaced-apart, side-by-side relationship. Each tilling unit of the type shown in FIG. 1 includes a downwardly depending ripper member 22 and two rotatable wheels 24 and 24a adjacent the ripper member. The wheels 24 and 24a are vertically adjustable and preferably are also adjustable forwardly and rearwardly relative to the ripper member, and even more preferably the wheels are adjustable horizontally inwardly and outwardly relative to the ripper member. These features are illustrated in more detail in FIGS. 4 and 5, which are described and discussed hereafter.

The wheels 24 and 24a are adapted to function as depth gauge wheels (i.e., to prevent the ripper member from penetrating into the soil beyond a desired depth) and also serve the extremely important function of holding the soil in the rows (i.e., where growing plants are located) firmly in place while the ripper member is pulled through the soil between the rows. When the ripper member 22 is positioned to run between two rows of growing crops, one wheel 24 runs close to one of the rows while the other wheel 24a runs close to the adjacent row on the opposite side of the ripper member 22.

Thus, the wheels 24 and 24a hold the row crops and the soil surrounding the roots of the crops firmly in place while the ripper member 22 effectively loosens the soil between the rows. Without the wheels 24 and 24a the ripper member can break the soil over a broader area and can disrupt the growing plants or the roots and thereby damage the growing plants.

For these reasons, the wheels are adjacent the ripper member, i.e., they are positioned close to the ripper member on each side thereof and they may be adjusted vertically to set the depth to which it is desired to have the ripper member penetrate the soil. This may be controlled, for example, by means of a threaded, rotatable rod 25 having handle 26. The threaded rod 25 is connected to a slide mechanism which is adapted to raise the wheel support member 27 when the rod 25 is rotated in one direction and is adapted to lower the wheel support member when the rod is rotated in the other direction. This feature is illustrated and described in more detail in connection with FIGS. 4 and 5 hereafter.

If desired, a coulter 30 (i.e., a rotatable disc having a sharp outer peripheral edge) may be carried by the tool bar ahead of the ripper member 22. The coulter is for cutting through any trash which may be in the field. The coulter is supported at the lower end of shaft 32 which is fastened to bracket 34, as illustrated in FIG. 1. The shaft 32 may be adjusted vertically relative to tool bar 12 by means of coupling 33.

Each tilling unit is individually mounted to the tool bar 12 in a manner such that each tilling unit may move vertically relative to the tool bar when the ripper member is in the soil. This enables precise depth control for each tilling unit in uneven ground conditions (e.g., hilly ground).

A preferred type of linkage between the tilling unit and the tool bar is illustrated in the drawings. Thus, there is shown a pair of upper support arms 40 and another pair of lower support arms 42 extending between the tool bar 12 and bracket 21 (which supports the ripper member 22, as shown). One end of each arm 40 is pivotably connected to support bracket 44 carried by the tool bar 12, and the opposite end of arm 40 is pivotably connected to bracket 21. Similarly, one end of each arm 42 is pivotably connected to support bracket 44, and the opposite end of arm 42 is pivotably connected to bracket 21.

This type of linking arrangement allows the tilling unit to move vertically relative to the tool bar when the ripper member 22 is in the soil. Thus, the tilling units along the tool bar may move vertically independently of the other tilling units, thereby allowing each tilling unit to maintain a proper depth in the soil even when the tool bar is moved upwardly or downwardly (e.g., when the tractor moves over uneven ground, or over rocks, etc.). This feature is very significant and is a distinct advantage over conventional implements.

Preferably the upper support arms 40 are parallel to the lower support arms 42, as shown. A stop member 43 on support bracket 44 (as illustrated in FIG. 1) prevents excessive downward movement of arms 40 so that when the three-point hitch of the tractor is raised (e.g., transport) the tilling units will also be raised with the tool bar.

Preferably the ripper member 22 is mounted to bracket 21 by means of bolts 28 and 29. Bolt 28 is a shear bolt so that the ripper member 22 may pivot rearwardly on bolt 29 if an obstruction is hit to cause shearing of bolt 28.

There may be any desired number of tilling units carried by the tool bar, and the tool bar may be of any desired length. A convenient length for the tool bar is, for example, 180 inches to 280 inches. There may be any desired number of separate tilling units carried by the tool bar. Typically the tilling units are spaced along the tool bar at increments of about 28 to 36 inches.

It is also preferable for a secondary tilling unit 50 to be attached behind the tilling unit, as illustrated. The secondary tilling unit 50 may include, for example, various cultivating tools (e.g., tines, cultivator shanks and shoes, disk units, packer baskets, guide disks) and gauge wheels. In FIG. 1 the secondary tilling unit is designated as 50, and in FIG. 2 it is designated as 50a.

Preferably the secondary tiller unit 50 includes a horizontal mounting bar 52 to which various tools may be attached. As illustrated in FIG. 1, there may be a gauge wheel 54, S-tine 56, disks 57, and packer basket 58 which are mounted on separate shanks carried by bar 52. The height of the gauge wheel, the packer basket, the disks, and the S-tines are adjustable. Preferably the tines and the disks are also adjustable inwardly and outwardly with respect to the bar 52, and preferably they may also be adjusted as to their angle about a vertical axis. A packer basket is used when bedding. There may instead be included a ditcher, if desired, for ditching between row crops.

Secondary tiller unit 50a shown in FIG. 2 is shown simply with an S-tine 56 attached to it via shank 55. Various other tools may be carried by unit 50a, as desired.

It is also preferable for the secondary tiller unit to be adapted to move vertically relative to the front tilling unit to which it is attached. This may be accomplished in the manner illustrated in the drawings. Thus, there is shown a hitch member 60 secured to each horizontal bar 52. The hitch member 60 includes downwardly facing hook member 62. Additional downwardly facing hook members 63 are carried by bar 51 at the forward end of bar 52.

A pair of upper connection arms 66 and a pair of lower connection arms 68 connect between the bracket 21 of the front tilling unit, the hitch member 60, and the hook members 63. One end of each upper connection arm 66 is pivotably connected to bracket 21, and the opposite end is pivotably connected to hitch member 60. One end of each lower connection arm 68 is pivotably connected to bracket 21, and the opposite end is pivotably connected to the hook member 63.

For a quick attachment technique, the hitch member 60 preferably includes downwardly facing hook members 62 which are adapted to receive rod member 67 which is carried by upper connection arms 66. Downwardly facing hook members 63 are adapted to receive rod member 69 which is carried by lower connection arms 68. After the quick attachment to the hooks has been made, it is desirable to close the lower hook members 63 (e.g., by inserting a pin 61 through each hook after rod member 69 has been inserted therein). In this manner the secondary tiller unit is readily and quickly attached to the front tilling unit or detached from it, as desired.

Preferably at least one end, or both ends, of the tool bar include means for detachably mounting an extension unit thereto. One convenient and desirable manner of effecting this is illustrated in FIG. 3. In such figure there is shown tool bar 12 which includes plate members 70 and 72 on opposite ends thereof. Each plate member 70 is vertically disposed, as illustrated. The upper portion of each plate includes a blade or bayonet 73 and 74, respectively. Each edge of each plate includes a plurality of apertures 71.

A tool bar extension member 80 is adapted to connect to the plate 72 on tool bar 12 as illustrated in FIG. 3. The inner end of the tool bar extension 80 includes a horizontal plate 82 having an opening therein which is adapted to receive the blade or bayonet 74 on plate 72. Then bolts 84 may be inserted through registering apertures in the extension member 80 and the edges of plate member 72 to detachably secure the extension to the tool bar. Another tilling unit may then be carried by the tool bar extension 80. The outer end of the extension 80 also includes a vertical plate member 85 (including blade or bayonet 86) to which an additional extension may be attached.

In this manner there may be secured to the tool bar one or more extension members to which additional tilling units may be attached. This allows one to expand the length of the tool bar to any desired working length.

Figure 4:
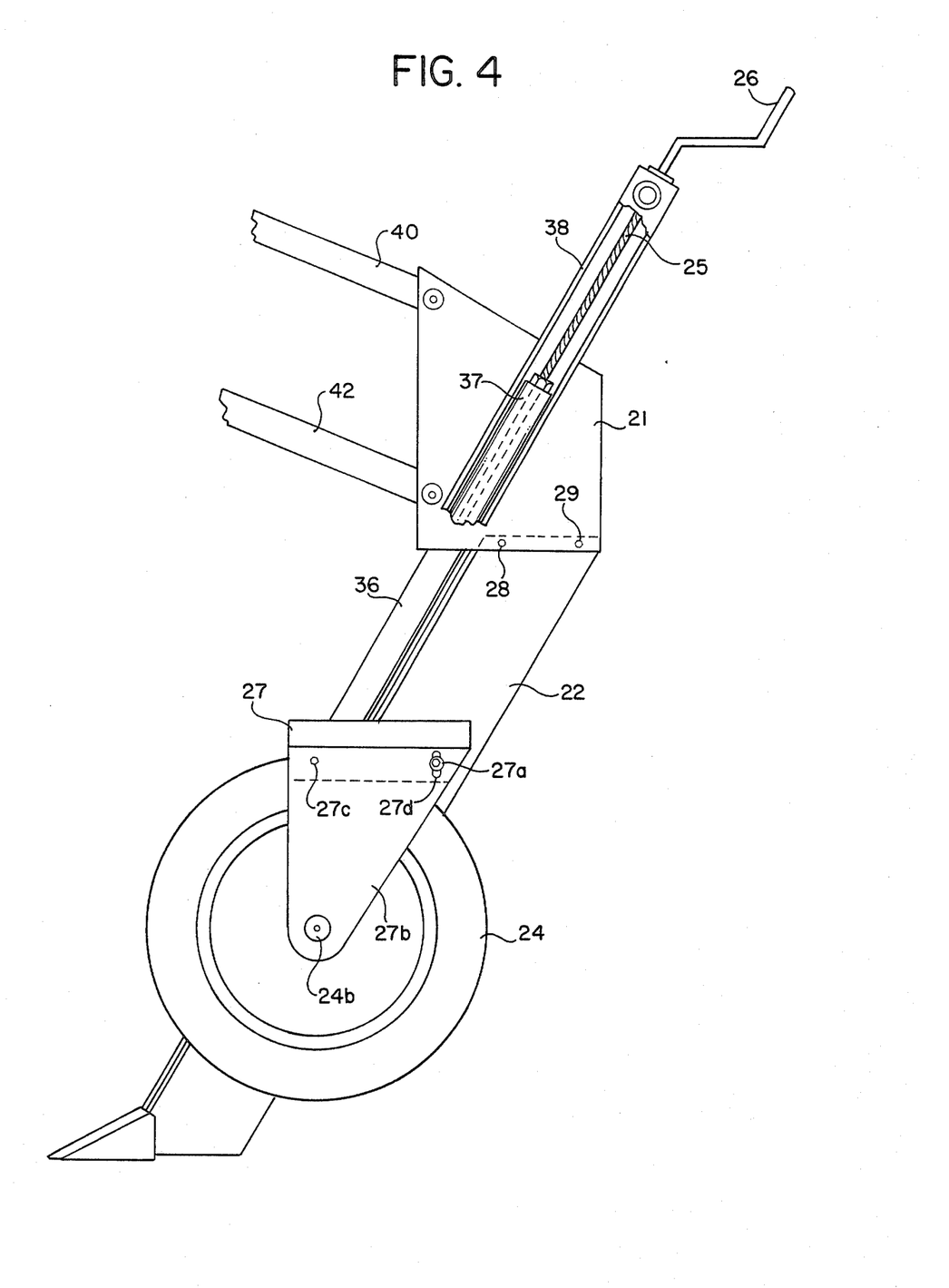
FIG. 4 is a side elevational, partial cut-away view of the tilling unit shown in FIG. 2.

FIG. 4 is an elevational view, partially cut-away, showing the manner in which the wheels on the tilling unit may be adjusted vertically. Wheel 24 is rotatably carried by wheel support 27 which is attached to the lower end of slide tube 36. The upper end 37 of tube 36 is slidably received within housing 38. Threaded rod 25 threadably engages the upper end of tube 37. When rod 25 is rotated in one direction by handle 26 the tube 36 is moved vertically in one direction, and when the rod 25 is rotated in the opposite direction the tube 36 is moved vertically in the other direction. In this manner the wheel support 27 is moved upwardly or downwardly, as desired, without changing the spacing or alignment of the wheels relative to the ripper member. This is because the slide tube 36 is parallel to the ripper member, as shown and illustrated.

The wheel support arm 27b may be moved forwardly or rearwardly, as desired, by loosening bolt 27a in slot 27d and then pivoting support arm 27b forwardly or rearwardly about pin 27c. Then bolt 27a may be tightened again when the wheel is in the desired position.

Figure 5:
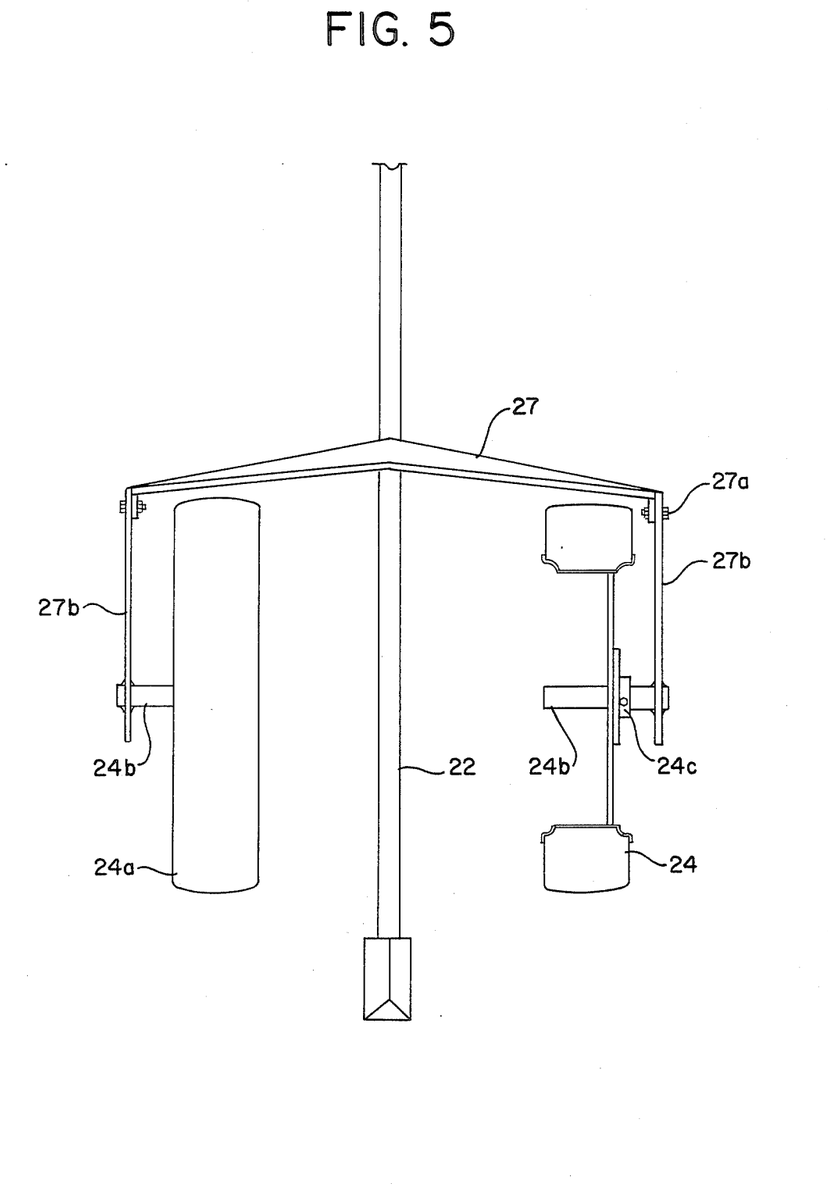
FIG. 5 is a front elevational partial cut-away view of the lower portion of a tilling unit.

FIG. 5 is a front elevational view illustrating one manner in which the wheels are adjustable inwardly and outwardly relative to ripper member 22. One wheel 24 is shown in partial cutaway to show the length of wheel support axle 24b. Collar 24c is adapted to secure the wheel to the axle at any desired position on the axle. This enables horizontal positioning of the wheel relative to ripper member 22.

The size of the wheels 24 and 24a may vary from a diameter of about 12 inches to a diameter of about 16 inches for best performance. The width of each wheel is generally in the range of about 3 to 5 inches, with a width of about 4 inches being preferred. The wheels may be of the inflatable type or the zero pressure type. Metal wheels could also be used, if desired.

The tilling implement of the invention may be used for tilling between any desired number of rows (e.g., 4, 6, or 8 rows, typically). When the tilling implement is used for preparing seed beds, typically it is adapted for 4, 6, or 8 rows in one pass.

Other variants are possible without departing from the scope of the present invention.

What is claimed is:

1. An agricultural tilling implement adapted to be connected to the rear of a tractor having a three-point hitch, wherein said implement comprises:
   (a) an elongated tool bar including first and second attachment means adapted to connect said tool bar to said three-point hitch in a manner such that said tool bar is transverse with respect to said tractor; wherein said first and second attachment means are spaced from each other on said tool bar;
   (b) a plurality of tilling units carried by said tool bar, each said tilling unit comprising:
      (i) a downwardly depending ripper member;
      (ii) two rotatable wheels adjacent said ripper member; said wheels being vertically adjustable; wherein said wheels are adapted to limit the depth of said ripper member in the soil;
   wherein each said tilling unit is connected to said tool bar by means of a linkage which is adapted to permit said tilling unit to move vertically relative to said tool bar when said ripper member is in the soil being tilled; wherein each said tilling unit includes a bracket from which said ripper member depends; wherein said linkage connects said bracket to said tool bar; wherein said linkage comprises:
      (a) a pair of upper support arms, each of which is pivotably supported at one of its ends by said tool bar and is pivotably supported at its opposite end by said bracket; and
      (b) a pair of lower support arms, each of which is pivotably supported at one of its ends by said tool bar and is pivotably suppored at its opposite end by said bracket.

2. A tilling implement in accordance with claim 1, wherein there are at least 6 of said tilling units.

3. A tilling implement in accordance with claim 2, wherein said tilling units are spaced apart from each other by a distance in the range of about 28 to 36 inches.

4. A tilling implement in accordance with claim 1, wherein said wheels are adapted to be adjusted forwardly and rearwardly relative to said ripper member.

5. A tilling implement in accordance with claim 1, wherein said wheels are adapted to be adjusted horizontally inwardly and outwardly relative to said ripper member.

6. A tilling implement in accordance with claim 1, further comprising a secondary tiller unit, wherein said secondary tiller unit includes a hitch member, and wherein said tiller unit is adapted to be attached to said tilling unit by connection means comprising:
 (a) a pair of upper connecting arms, each of which is pivotably attached at one of its ends to said tilling unit and is pivotably attached at its opposite end to said hitch member;
 (b) a pair of lower connecting arms, each of which is pivotably attached at one of its ends to said tilling unit and is pivotably attached at its opposite end to said hitch member;
whereby said secondary tiller unit may move vertically relative to said tilling unit.

7. An agricultural tilling implement adapted to be connected to the rear of a tractor having a three-point hitch, wherein said implement comprises:
 (a) an elongated tool bar including first and second attachment means adapted to connect said tool bar to said three-point hitch in a manner such that said tool bar is transverse with respect to said tractor; wherein said first and second attachment means are spaced from each other on said tool bar;
 (b) a plurality of tilling units carried by said tool bar, each said tilling unit comprising:
  (i) a downwardly depending ripper member;
  (ii) two rotatable wheels adjacent said ripper member; said wheels being vertically adjustable; wherein said wheels are adapted to limit the depth of said ripper member in the soil;
wherein each said tilling unit is connected to said tool bar by means of a linkage which is adapted to permit said tilling unit to move vertically relative to said tool bar when said ripper member is in the soil being tilled;
 (c) a secondary tiller unit attached to each said tilling unit;
wherein each said tilling unit includes a bracket from which said ripper member depends; wherein said linkage connects said bracket to said tool bar; wherein said linkage comprises:
 (a) a pair of upper support arms, each of which is pivotably supported at one of its ends by said tool bar and is pivotably supported at its opposite end by said bracket; and
 (b) a pair of lower support arms, each of which is pivotably supported at one of its ends by said tool bar and is pivotably supported at its opposite end by said bracket.

8. A tilling implement in accordance with claim 7, wherein there are at least 6 of said tilling units.

9. A tilling implement in accordance with claim 7, wherein said tilling units are spaced apart from each other by a distance in the range of about 28 to 36 inches.

10. A tilling implement in accordance with claim 7, wherein said secondary tiller unit includes a hitch member, and wherein said tiller unit is adapted to be attached to said tilling unit by connection means comprising:
 (a) a pair of upper connecting arms, each of which is pivotably attached at one of its ends to said tilling unit and is pivotably attached at its opposite end to said hitch member;
 (b) a pair of lower connecting arms, each of which is pivotably attached at one of its ends to said tilling unit and is pivotably attached at its opposite end to said hitch member;
whereby said secondary tiller unit may move vertically relative to said tilling unit.

11. A tilling implement in accordance with claim 10, wherein said hitch member on said secondary tiller unit comprises downwardly depending hook members.

12. A tilling implement in accordance with claim 7, wherein at least one end of said tool bar includes a vertical plate member, wherein said plate member includes an upstanding bayonet member.

13. A tilling implement in accordance with claim 12, further comprising a tool bar extension member having on one end thereof a horizontal plate having an opening therein, wherein said bayonet member on said tool bar is received in said opening in said horizontal plate to align said extension member with said tool bar.

14. A tilling implement in accordance with claim 12, wherein each end of said tool bar includes a vertical plate member which includes an upstanding bayonet member, and wherein a tool bar extension member is detachably connected to each end of said tool bar by means of a said bayonet member.

15. An agricultural tilling implement adapted to be connected to the rear of a tractor having a three-point hitch, wherein said implement comprises:
 (a) an elongated tool bar including attachment means adapted to connect said tool bar to said three-point hitch in a manner such that said tool bar is transverse with respect to said tractor;
 (b) a plurality of tilling units carried by said tool bar, each said tilling unit comprising:
  (i) a downwardly depending ripper member;
  (ii) two rotatable wheels adjacent said ripper member; said wheels being vertically adjustable; wherein said wheels are adapted to limit the depth of said ripper member in the soil;
wherein each said tilling unit is connected to said tool bar by means of a linkage which is adapted to permit said tilling unit to move vertically relative to said tool bar when said ripper member is in the soil being tilled;
 (c) a secondary tiller unit attached to each said tilling unit;
wherein said wheels are adapted to be adjusted forwardly and rearwardly relative to said ripper member; and wherein said wheels are adapted to be adjusted horizontally inwardly and outwardly relative to said ripper member.

16. A tilling implement in accordance with claim 15, wherein said tilling units are spaced apart from each other by a distance in the range of about 28 to 36 inches.

17. A tilling implement in accordance with claim 15 wherein each said tilling unit includes a bracket from which said ripper member depends; wherein said linkage connects said bracket to said tool bar; wherein said linkage comprises:
 (a) a pair of upper support arms, each of which is pivotably supported at one of its ends by said tool bar and is pivotably supported at its opposite end by said bracket;
 (b) a pair of lower support arms, each of which is pivotably supported at one of its ends by said tool bar and is pivotably supported at its opposite end by said bracket;

whereby said tilling unit may move vertically relative to said tool bar when said ripper member is in the soil.

18. An agricultural tilling implement adapted to be connected to the rear of a tractor having a three-point hitch, wherein said implement comprises:
   (a) an elongated tool bar including attachment means adapted to connect said tool bar to said three-point transverse with respect to said tractor;
   (b) a plurality of tilling units carried by said tool bar, each said tilling unit comprising:
      (i) a downwardly depending ripper member;
      (ii) two rotatable wheels adjacent said ripper member; said wheels being vertically adjustable; wherein said wheels are adapted to limit the depth of said ripper member in the soil;
   wherein each said tilling unit is connected to said tool bar by means of a linkage which is adapted to permit said tilling unit to move vertically relative to said tool bar when said ripper member is in the soil being tilled; wherein one said wheel is positioned on one side of said ripper member and the other said wheel is positioned on the opposite side of said ripper member; wherein said linkage comprises:
      (a) a pair of upper support arms, each of which is pivotably supported at one of its ends by said tool bar and is pivotably supported at its opposite end by said bracket;
      (b) a pair of lower support arms, each of which is pivotably supported at one of its ends by said tool bar and is pivotably supported at its opposite end by said bracket.

19. A tilling implement in accordance with claim 18, wherein said wheels are adapted to be adjusted forwardly and rearwardly relative to said ripper member; and wherein said wheels are adapted to be adjusted horizontally inwardly and outwardly relative to said ripper member.

20. A tilling implement in accordance with claim 18, wherein said tilling units are spaced apart from each other by a distance in the range of about 28 to 36 inches.

21. An agricultural implement comprising a tool bar which is adapted to be connected to the rear of a tractor having a three-point hitch, wherein said tool bar includes first and second ends and at least one tool carried by said tool bar; wherein said first end includes a vertical plate member which includes an upstanding bayonet member, and wherein said implement further comprises a tool bar extension member having on one end thereof a horizontal plate having an opening therein; wherein said bayonet member on said tool bar is received in said opening in said horizontal plate to align said extension member with said tool bar.

22. An implement in accordance with claim 21, wherein said tool bar and said extension member include abutting flanges having apertures therein; and wherein said flanges are bolted together.

* * * * *